United States Patent [19]

Schwemmer et al.

[11] Patent Number: 4,993,523

[45] Date of Patent: Feb. 19, 1991

[54] FLUID CIRCUIT FOR SEMIACTIVE DAMPER MEANS

[75] Inventors: Leonard J. Schwemmer; Robert H. Marjoram, both of Erie, Pa.

[73] Assignee: Lord Corporation, Erie, Pa.

[21] Appl. No.: 310,062

[22] Filed: Feb. 10, 1989

[51] Int. Cl.$^5$ .............................................. F15F 9/34
[52] U.S. Cl. ................................... 188/299; 188/319; 188/322.15; 137/625.4
[58] Field of Search ........... 188/285, 299, 319, 322.15; 137/625.4

[56] References Cited

U.S. PATENT DOCUMENTS

| | | | |
|---|---|---|---|
| 1,810,233 | 6/1931 | Walden | 188/319 |
| 2,235,488 | 3/1941 | Mercier | 188/88 |
| 2,743,738 | 5/1956 | Johnson | 137/625.4 |
| 3,321,210 | 5/1967 | Delchev | 280/6 |
| 3,420,341 | 1/1969 | Keehn, II | 188/88 |
| 3,807,678 | 4/1974 | Karnopp et al. | 248/358 R |
| 3,826,343 | 7/1974 | Heymann | 188/282 |
| 3,827,538 | 8/1974 | Morgan | 188/319 |
| 3,995,883 | 12/1976 | Glaze | 280/707 |
| 4,024,845 | 5/1977 | Nomura | 137/625.4 X |
| 4,034,860 | 7/1977 | Leppich | 188/282 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,530,425 | 7/1985 | Veaux et al. | 188/299 |
| 4,588,053 | 5/1986 | Foster | 188/280 X |
| 4,620,619 | 11/1986 | Emura et al. | 188/319 |
| 4,635,765 | 1/1987 | Schmidt | 188/299 |
| 4,660,686 | 4/1987 | Münning et al. | 188/280 |
| 4,671,392 | 6/1987 | Wossner | 188/299 |
| 4,696,489 | 9/1987 | Fujishiro et al. | 280/707 |
| 4,732,408 | 3/1988 | Ohlin | 188/299 X |
| 4,742,998 | 5/1988 | Schubert | 267/136 |
| 4,743,000 | 5/1988 | Karnopp | 188/299 X |
| 4,743,300 | 5/1988 | Karnopp | 267/218 |
| 4,756,549 | 7/1988 | Kurosawa et al. | 280/707 |
| 4,786,034 | 11/1988 | Heess et al. | 267/64.15 |

FOREIGN PATENT DOCUMENTS

| | | | |
|---|---|---|---|
| 141939 | 9/1948 | Australia | 137/625.4 |
| 221602 | 5/1987 | European Pat. Off. | 188/319 |
| 1336186 | 7/1963 | France . | |
| 1188453 | 4/1970 | France . | |
| 19871 | 2/1977 | Japan | 188/319 |
| 48777 | 4/1977 | Japan | 188/285 |
| 9374 | 1/1982 | Japan | 137/625.4 |
| 2164120 | 3/1986 | United Kingdom . | |

OTHER PUBLICATIONS

Crosby et al., Vibration Control Using Semi-Active Force Generators, Transaction of the ASME Paper No. 73-DET-122.

Margolis et al., Heave Mode Dynamics of a Tracked Air Cushion Vehicle with Semiactive Airbag Secondary Suspension, Journal of Dynamic Systems Measurement and Control, Dec. 1975, pp. 399-407.

Margolis, Semi-Active Control of Wheel Hop in Ground Vehicles, Vehicle System Dynamics, 1983, pp. 317-330.

Krasnicki, The Experimental Performance of an "On-Off" Active Damper, Lord Corporation technical article, circa 1981.

Hrovat et al., An Experimental Comparison Between Semiactive and Passive Suspensions for Air-Cushion Vehicles, Int. J. of Vehicle Design, 1981.

Lord Corporation Semi-Active Suspensions, Lord Corporation technical article.

Margolis, The Chatter of Semi-Active On-Off Suspensions and Its Cure, Vehicle System Dynamics, vol. 13, 1984.

*Primary Examiner*—George E. A. Halvosa
*Attorney, Agent, or Firm*—Bell, Seltzer, Park & Gibson

[57] ABSTRACT

The fluid circuit when in a first condition permits relatively free fluid flow in a first direction between variable volume chambers of the damper, while permitting only relatively restricted flow in an opposite, second direction. When in a second condition, the circuit permits relatively free flow of fluid in the second direction and only relatively restricted flow in the second direction. The circuit condition is changed by changing the position of a control valve which is subjected to fluid pressure differentials that may at times delay change in the position of the valve, and therefore change in the condition of the circuit.

11 Claims, 2 Drawing Sheets

FLUID CIRCUIT FOR SEMIACTIVE DAMPER MEANS

FIELD OF THE INVENTION

This invention relates to semiactive damper means for attenuating transmission of vibratory, shock and similar forces between relatively movable interconnected members such as the sprung and unsprung body and frame members of a motor vehicle. The invention more specifically relates to a semiactive damper having improved fluid circuitry which simplifies control of the damper and reduces the number of control functions that must be performed by electronic or other means requiring extrinsic power.

BACKGROUND OF THE INVENTION

Semiactive dampers are rapidly and repeatedly switched between high damping and low damping states in accordance with the dictates of a preselected control policy. One known control policy dictates that the damper be "on" or in a state of relatively high damping when the product of the relative velocity between the members interconnected by the damper, and thus "across" the damper itself, times the absolute velocity of the supported one of the aforesaid members, is greater than zero (i.e., is positive); and that the damper be in a low damping or "off" state when the aforesaid product equal to or less than zero (i.e., is negative or zero). Another known damper control policy dictates that the damper be in its relatively high damping or "on" state when the product of the relative velocity across it times the relative displacement between the sprung and unsprung members is less than zero (i.e., is negative or minus); and be in its relatively low damping or "off" state when the aforesaid product is greater than zero (i.e., when the sign is positive or plus). In optional modified versions of the aforesaid control policies, changes from one to the other of the damper states are deferred until the relative velocity across the damper is no greater than some preselected relatively low magnitude.

The foregoing and similar damper control policies may be and usually are implemented by electronic means which electronically monitors the conditions of motion of the damper and/or the members interconnected thereby, utilizes the monitored data (or data derived from it) to process the particular algorithm of the control policy, and then produces control signals that effect whatever change in the damping state of the damper as is dictated by the policy. The latter step usually is accomplished by the changing the position of an electrically or otherwise extraneously powered valve member that controls the flow of the hydraulic fluid of the damper. Under certain conditions of use, the power consumption, attendant heat generation, cost, efficiency and/or durability of semiactive dampers of the foregoing type may be unsatisfactory.

With the foregoing in mind, the primary object of the present invention is to provide an improved semiactive damper wherein significant monitoring and/or control functions are performed automatically by and more efficiently by hydro-mechanical means, rather than electrically.

SUMMARY OF THE INVENTION

The semiactive damper of the present invention has a fluid circuit that in a first condition permits relatively free flow of the hydraulic fluid of the damper in a first direction while permitting only relatively restricted fluid flow in the opposite direction, and that in a second condition permits only relatively restricted fluid flow in the first direction, while permitting relatively free fluid flow in the opposite direction. Since changes in the fluid flow direction occur in response to changes in the sign of the relative velocity across the damper (i.e., occur when the damper ceases undergoing extension and commences undergoing contraction, and vice-versa), electronic or other extrinsic determination of the sign of the relative velocity across the damper, and electronic or similar extrinsic variation of the condition of the fluid circuit, are not required when a change in the damping state of the damper is dictated by the control policy in response to a change in the sign of the relative velocity across the damper. Electrically or otherwise extrinsically powered motion determining and/or imparting devices are therefore required only for those changes in damper state that are dictated by the other control policy parameter, such as the absolute velocity of the sprung member. In an automobile vehicle suspension system, and in many other environments, the number of damper state changes that are dictated by changes in the sign of the relative velocity of the damper greatly exceed those state changes dictated by changes in the sign of the absolute velocity of the sprung member.

In certain semiactive damper utilizations, it is also desirable to delay at least some damper state changes until such time as the relative velocity across the damper is no greater than a preselected magnitude. In the preferred form thereof, the fluid circuit of the present semiactive damper is also of a pressure-sensitive type that automatically performs the foregoing function, without electronic or similar determination of the magnitude of the relative velocity.

DESCRIPTION OF THE DRAWINGS

Additional features of the present invention will be apparent from the following description of an illustrative embodiment thereof, which should be read in conjunction with the accompanying drawing, in which.

DESCRIPTION OF THE ILLUSTRATED EMBODIMENTS

Figure 1:
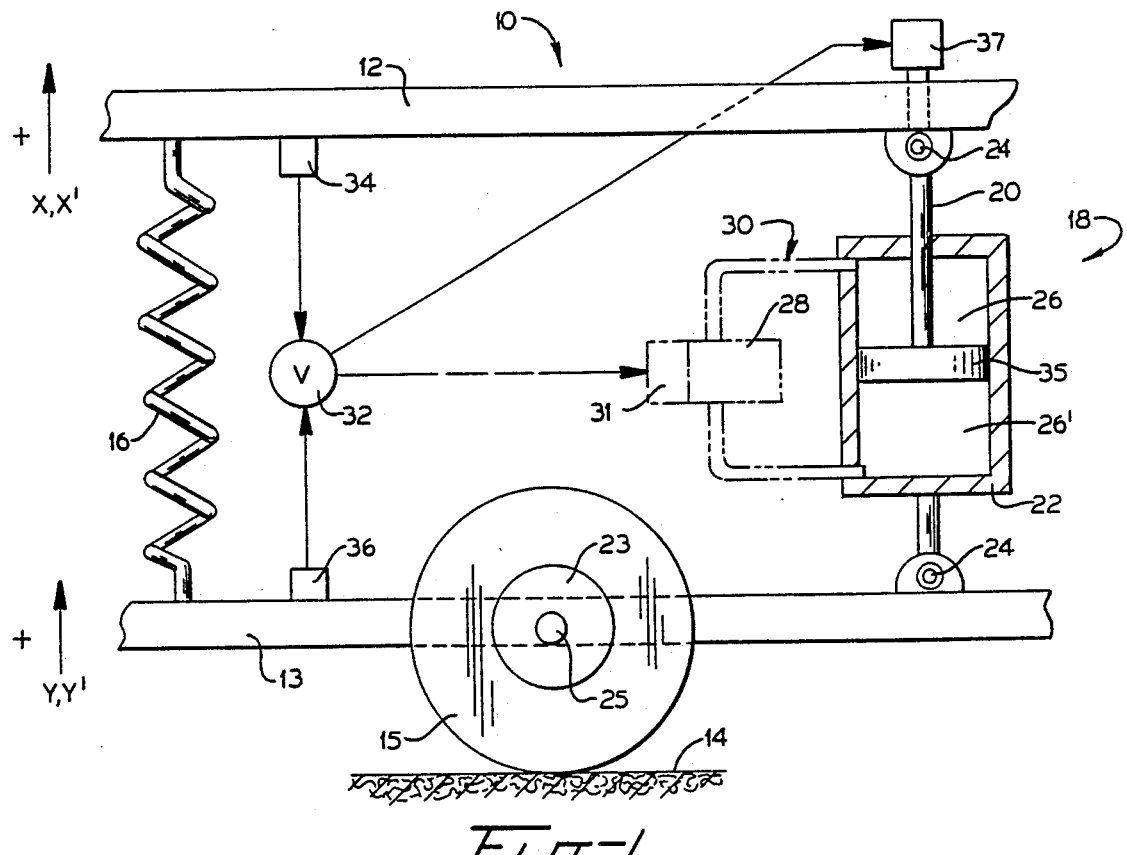
FIG. 1 is a schematic view of a vehicle suspension or similar mounting system having semiactive damper means in accordance with the invention, some additional components also being shown in phantom lines.

The numeral 10 in FIG. 1 designates a force-attenuating mounting system interconnecting vertically spaced and relatively movable supported and supporting members 12, 13, respectively. Members 12, 13 may be the sprung and unsprung body and frame components of an automobile or other motor vehicle that is supported upon a road or similar surface 14 by conventional resiliently deformable tire members 15, only one of which is shown. A primary function of a vehicle suspension system such as said system 10 might be to isolate supported member 12 insofar as possible from vibratory and/or other forces transmitted to member 13 by such things as road surface irregularities. The letters X, X' respectively designate the absolute vertical displacement and the absolute vertical velocity of the sprung member 12, it being arbitrarily indicated that these are positive when in an upward direction and thus are negative when in a downward direction. The same sign convention and the letters Y, Y' similarly designate the absolute vertical displacement and the absolute velocity of sprung member 13.

System 10 includes compression spring means 16 and semiactive damper means 18 which extend in substantially parallel relationship to each other between members 12, 13, and are connected to such members. Although it might be of other extendable and retractable and fluid-containing type, damper assembly 18 is illustratively of the hydraulic piston and cylinder type. The piston rod 20 and cylinder 22 of damper 18 are secured to respective ones of the supported and supporting members 12, 13 by suitable connectors that illustratively include deformable bushing members 24 formed of elastomer or similar resilient compliant material. Relative vertical movement between sprung and unsprung members 12, 13 causes relative vertical movement between rod 20 and cylinder 22. This, in turn creates a pressure differential and flow of hydraulic fluid (not shown) between variable volume chambers 26, 26' of damper 18. As is indicated by phantom lines, the fluid flow between chambers 26, 2640 may be via an external fluid circuit 30 containing a control valve 28 drivable by an associated electrical actuator or drive means 31 in response to electrical or other control signals from a controller 32 that receives data from motion sensors 34, 36 which respectively monitor the motions of members 12, 13. However, in the preferred embodiment, the fluid circuitry for conducting and controlling the flow of hydraulic fluid between damper chambers 26, 26' instead may be and illustratively is associated with the damper's piston 35 and piston rod 20, and the control signals from controller 32 are instead directed to an actuator or drive means 37 mounted upon the upper end of rod 20. When rod 20 is of the illustrated type that projects from only one end of damper cylinder 22, the damper may and normally would be provided with a fluid accumulator (not shown) that compensates in a known manner for the volumetric differential between chambers 26, 26' that results from the presence of the rod in only the former chamber.

Figure 2:
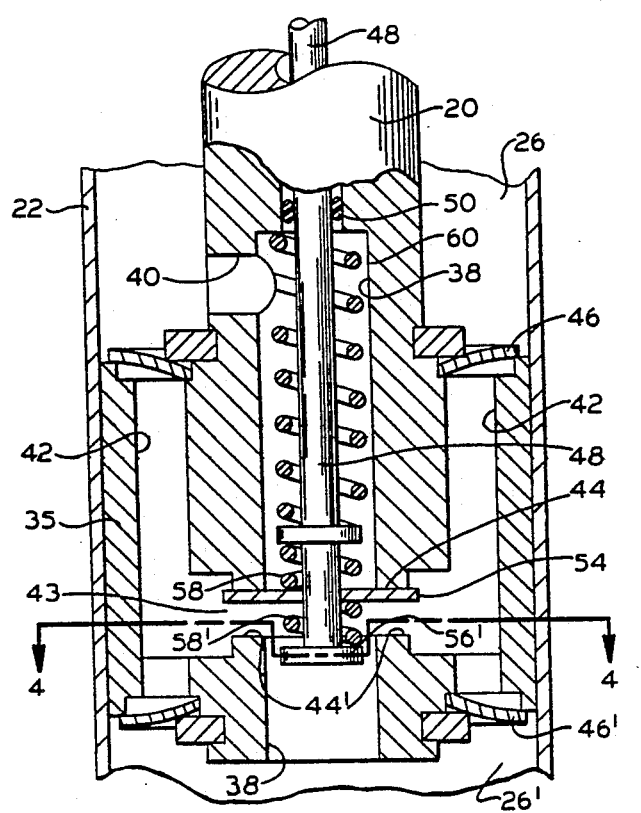
FIG. 2 is an enlarged vertical sectional view of the piston and portions of the rod and cylinder of the damper assembly schematically illustrated in FIG. 1, showing fluid circuit components thereof in a first operating condition.
Figure 3:
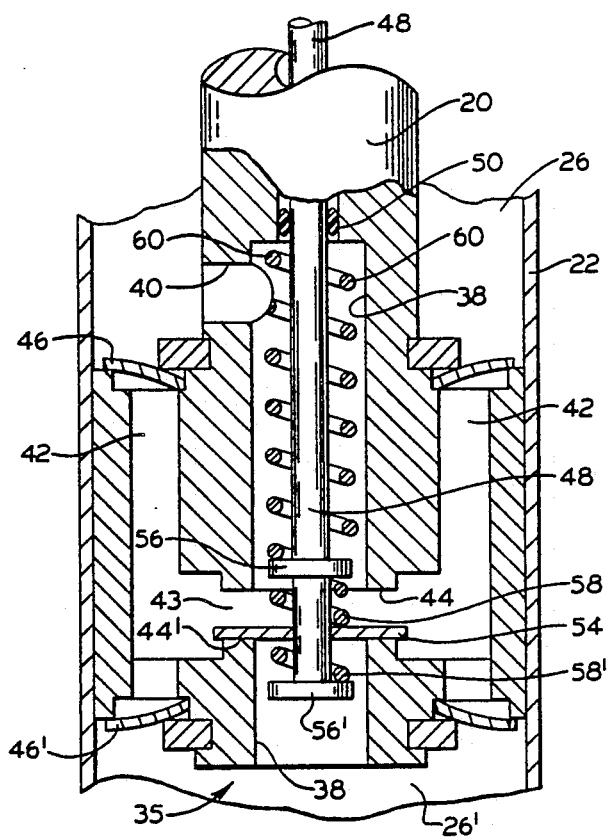
FIG. 3 is a view similar to FIG. 2, but showing the circuit components in the second operating condition.
Figure 4:
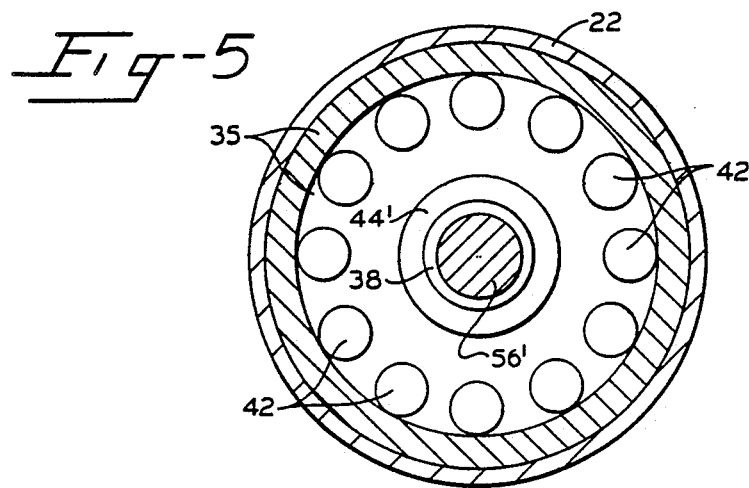
FIG. 4 is a sectional view taken substantially along the line 4—4 of FIG. 2.

Referring now also more particularly to FIGS. 2-4 of the drawings, the fluid circuitry associated with piston 35 and/or the thereto connected lower end of piston rod 20 includes a central axially-extending passageway 38 communicating adjacent its upper end with upper damper chamber 26 via a port 40, and communicating adjacent its lower end with lower damper chamber 26'. The fluid circuitry further includes a plurality of passageways 42 that are spaced radially outwardly from and extend generally parallel to central passageway 38. Passageways 38, 42 are interconnected intermediate their lengths by a radially extending annular space or passageway 43. At its intersection with passageway 43, passageway 38 has encircling annular valve seats 44, 44' that are concentric with the central axis of piston 35 and are spaced vertically from each other. The upper and lower ends of outer passageways 42 are respectively overlaid by resilient annular valve elements 46, 46'. Upper valve element 46 prevents significant fluid flow from the upper ends of passages 42 except at such time as the pressure of the fluid within such passageways reaches a preselected magnitude. It then permits only a relatively restricted flow of such fluid. Lower valve element 46' similarly permits fluid flow from the lower ends of passageways 42 into lower damper chamber 26' only when the fluid pressure within such passageways reaches a preselected magnitude, and even then significantly restricts such fluid flow.

Rod 20 of damper 18 has a central passageway through which an axially movable valve support rod 48 passes. The upper end of rod 48 is connected to an electrically or otherwise externally powered actuator, such as that designated by the numeral 37 in FIG. 1, upon the upper end of piston rod 20. The lower end portion of rod 48 extends through a suitable fluid seal 50 into passageway 38. An annular valve member 54 is carried by rod 48 for sliding movement between axially-spaced shoulders 56, 56' thereon. Valve member 54 projects radially outwardly from rod 48 into the space between valve seats 44, 44'. Upper and lower counteracting coil springs 58, 58' encircle rod 48 between valve member 54 and respective ones of the shoulders 56, 56'. The springs bias valve member 54 to a position approximately equidistance from shoulders 56, 56' while permitting limited axial movement of the valve member relative to rod 48 when it is subjected to a fluid pressure differential of sufficient magnitude. Actuator 37 (FIG. 1) moves rod 48 axially in response to commands from controller 32, to either its upward position of FIG. 2 or its downward position of FIG. 3. In the upward, FIG. 2 position of rod 48, valve member 54 engages or is at least disposed in close proximity to upper valve seat 44. In this first condition of the fluid circuitry, high damping is produced during contraction or compression of damper 18 since the higher-pressure fluid then entering the lower section of central passageway 38 from lower damper chamber 26', must pass through passages 43, 42 and flow restricting valve member 46 to reach upper damper chamber 26. Flow through the upper part of passage 58 and port 40 is blocked by valve 54, which is maintained in firm engagement with seat 44 by the upward position of rod 48 and also by the upwardly directed fluid-pressure force upon the valve's lower surface. If the sign of the relative velocity across damper 18 should change (i.e., the damper should cease contracting and begin extending) while the circuitry is in its aforesaid FIG. 2 condition, change in the damper state from high to low occurs automatically, without any change in the position of rod 48 or in the condition of the actuator 37 connected to its upper end. This is because the then greater pressure of the hydraulic fluid within upper damper chamber 26, and thus within the upper portion of passage 38, displaces valve 54 downwardly away from the upper valve seat 44 previously engaged thereby. The strength of lower compression spring 58' is such as to permit the aforesaid movement of valve member 54 away from upper valve seat 44, while preventing engagement of valve member 54 with lower seat 44'. The ensuing vertically spaced relationship of valve member 54 to both seats 44, 44' therefore permits relatively free flow of hydraulic fluid from upper damper chamber 26 to lower damper chamber 26', which flow passes from upper damper chamber 26 into the upper portion of central fluid passage 38 via port 40, then from the lower end of the upper portion of central passageway 38 and about the outer periphery of valve member 54, and then through the lower portion of passageway 38. If the sign of the relative velocity across damper 18 should again change, i.e., if the damper should again start undergoing contraction, valve member 54 would of course again be moved automatically, by lower spring 58' and by the then greater fluid pressure within lower damper chamber 26', into firm seated engagement with upper valve seat 44.

FIG. 3 of the drawings shows the fluid circuit components in a second condition wherein downward movement of control rod 48 by actuator 37 (FIG. 1) has displaced valve member 54 from its FIG. 2 position of close proximity to upper valve seat 44 to a position closely adjacent lower valve seat 44'. In its FIG. 3 illustrated second circuit condition, damper 18 is in a high damping state during extension since the downward position of rod 48 and then greater fluid pressure within upper damper chamber 26 firmly seats valve member 54 against lower valve seat 44'. The fluid passing downwardly from the lower end of the upper part of passage 38 therefore must pass radially outwardly through passage 43 into passages 42, and then by the flow restricting valve 46' at the lower ends of passages 42. Change of the damper state from high to low occurs automatically without any displacement of support rod 48 or change in the condition of actuator 37, upon change of the sign of the relative velocity across damper 18, i.e., when the damper stops extending and starts contracting. The then greater pressure of the fluid within lower chamber 26' of the damper displaces valve member 54 upwardly, against the biasing force of upper spring 58, to an intermediate position wherein member 54 is spaced vertically from both valve seats 44, 44'. Fluid flow then occurs relatively freely from damper chamber 26' to damper chamber 26 via central passage 38 of the fluid circuit. If the sign of the relative velocity across damper 18 should again change, valve member 54 is again returned automatically to its illustrated FIG. 3 position, by upper spring 58 and the then greater fluid pressure within upper damper chamber 26.

As is evident from the foregoing, all damper state changes that are dictated by sign changes of the relative velocity parameter of the damper control policy are achieved automatically by purely mechanical means of an inexpensive and durable nature. The motion sensing monitors or sensors, electronic controller 32, and powered actuator 37 therefore are needed only for damper state changes that are dictated by changes of the other parameter of the control policy, e.g., the absolute velocity of the supported member. As previously noted, damper state changes of this latter type are normally required much less frequently than those dictated by a change in the sign of the relative velocity across the damper.

At certain times during operation of damper 18, it may be desirable for damper state changes that are dictated by a change in the sign of the control policy parameter other than the relative velocity, e.g., the absolute velocity of the supported member, to be delayed until such time as the relative velocity across the damper is no greater than some preselected relatively low magnitude. One such time is when damper 18 is in its high damping state and one or more compliant resilient system components that are in series with it, such as tire 15 and/or the bushings 24 shown in FIG. 1, are in a highly deformed energy-storing condition. Change of the damping state of damper 18 from high to low when the foregoing situation exists, and when the relative velocity across the damper is relatively high, could result in abrupt reduction in the load upon the resilient compliant members, with ensuing abrupt release of their stored energy into the system. Among other possible detrimental consequences, this may result in objectionable "banging" noise. With the present damper 18, the switching delay necessary to prevent the foregoing undesirable results can be achieved in a simple and economical manner.

Thus assume the situation in which damper is contracting, control rod 48 and valve member 54 are in their positions of FIG. 2, and actuator 37 (FIG. 1) is commanded to drive control rod 48 downwardly and thus change the damping state from high to low. In this situation the downwardly directed forces imposed upon rod 48 and valve member 54 are opposed by upward forces imposed upon the rod and valve components by the pressure of the fluid within damper chamber 26'. Movement by actuator 37 of the rod and valve will not occur until such time as the magnitude of the opposing fluid pressure force, which is a function of the relative velocity across the damper, is less than the magnitude of the actuator force. This will also be the case in the situation where damper 18 is extending, control rod 48 and valve member 54 occupy their FIG. 3 positions, and actuator 37 is commanded to drive control the rod and valve member upwardly to change the damping state from high to low. A desired delay of actuator-induced changes in the damper state from high to low can therefore be achieved simply by use of an actuator 37 or other drive means whose force output is such as to be capable of producing the aforesaid movements of rod 48 and valve member 54 only when the opposing fluid pressure force upon such components, and thus the then-existing relative velocity across the damper, is less than a preselected relatively low magnitude.

Instead of consisting of a double-acting actuator 37, as previously described, the drive means that imparts movement to control rod 48 may consist of a single-acting actuator that imparts movement in only one direction, e.g., upwardly, and other means that imparts movement in the opposite direction. The spring 60 shown by phantom lines in FIGS. 2 and 3 may be provided for the latter foregoing purpose. Spring 60 encircles that part of control rod 48 within circuit passage 38 and has opposite end portions that respectively abut the upper end wall of passage 38 and the upper shoulder 56 of rod 48. Spring 60 is compressed when control rod 48 is moved to its FIG. 2 position by the single-acting equivalent of actuator 37. Upon deenergization of such actuator, spring 60 moves rod 48 and valve member 54 downwardly to the position thereof shown in FIG. 3. If delayed switching from the high damping to the low damping state is desired, the preselected force of spring 60 is such as to be insufficient to cause the aforesaid movement until the opposing fluid pressure force, and therefore the relative velocity across the damper, is no greater than a preselected relatively low magnitude. In order to similarly provide a desired delay in the change from the damping state high to low when damper 18 is extending and the fluid circuitry is as shown in FIG. 3, the force of spring 60, as well as that of the fluid pressure, must be taken into consideration in selecting the magnitude of the force produced by the actuator.

If spring 60 is provided, it may also be possible to eliminate spring 58 and upper rod shoulder 56, such that the lower end of spring 60 would then engage the upper surface of valve member 54 and perform the function of spring 56 as well as the previously described rod-driving function.

An advantage of the use of spring 60 is that it ensures that damper 18 will be in a high damping state during extension in the event of failure of the actuator or its power supply. Another advantage is that the spring ensures that control rod 48 is always in tension, which allows the use of a smaller diameter rod without buckling-type failure thereof.

Although the illustrated location of actuator 37 adjacent the upper portion of piston rod 20 is preferred for various reasons, the actuator might instead be located within damper cylinder 22 adjacent either the top or the bottom of piston 35. In such a case, electrical or other power could be conducted to the actuator through lines extending through the central opening of the piston rod of the damper.

Figure 5:
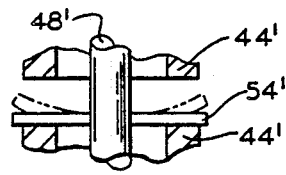
FIG. 5 is a fragmentary side elevational view of an alternative construction of a valve member of the damper.

FIG. 5 shows an alternative embodiment in which the previously described valve member 54, slidably mounted upon rod 48, is replaced by a valve member 54' having its central portion fixedly secured to rod 48, and having a resilient flexible outer peripheral portion. As is indicated by phantom lines in FIG. 5, when valve member 54' is in its illustrated lower position adjacent lower valve seat 44', and damper 18 undergoes compression, the fluid pressure forces upon the lower surface of the valve member will deflect its peripheral portion upwardly to an extent permitting relatively free upward flow of fluid through passage 38. When valve member 54' occupies its upward position adjacent upper valve seat 44, and damper 18 is undergoing extension, the fluid pressure causes downward deflection of the periphery of valve member 54' that similarly permits relatively free downward fluid flow through passage 38.

The flow-controlling pressure-sensitive valve elements at the opposite ends of passages 42 are of a known one-way type that permit flow outwardly from the end passages 42. If replaced by bidirectional valve means, communication between passages 42 and annular passage 43 would not be necessary. This would also be the case if pressure sensitivity were not desired and unvalved constrictive passages were provided, instead of the valved and relatively large passages 42, either at the locations of passages 42 or at some other location between damper chambers 26, 26'.

While specific embodiments of the invention have been shown and described, this was for purposes of illustration only, and not for purposes of limitation, the scope of the invention being in accordance with the following claims.

We claim:

1. Semiactive damper means, comprising:

an extendable and contractible hydraulic damper assembly having relatively movable piston and cylinder members defining first and second variable volume chambers containing hydraulic fluid, extension and contraction of said assembly causing a fluid pressure differential between said chambers;

fluid circuit means within said piston member, said fluid circuit means having a first operating condition, and a second operating condition, and interconnecting said chambers;

said fluid circuit means when in said first condition thereof permitting relatively free flow of said fluid from said first of said chambers to said second of said chambers during extension of said damper assembly, and permitting only relatively restricted flow of said fluid from said second of said chambers to said first of said chambers during contraction of said damper assembly;

said circuit means when in said second condition thereof permitting relatively free flow of said fluid from said second of said chambers to said first of said chambers during contraction of said damper assembly, and permitting only relatively restricted flow of said fluid from said first of said chambers to said second of said chambers during extension of said damper assembly;

said circuit means including a control valve member movable in translation between first and second mutually spaced valve seats, said circuit means being in said first condition thereof when said control valve is in engagement with said first of said valve seats and said circuit means being in said second condition thereof when said valve is in engagement with said second of said valve seats;

said control valve member being subjected during extension and contraction of said damper assembly to fluid pressure forces created by said fluid pressure differential, said fluid pressure forces urging said control valve member toward said first of said valve seats during contraction of said assembly and toward said second of said valve seats during extension of said assembly; and extrinsically powered valve drive means for imparting to said control valve member driving forces that are sufficient to move said control valve from one to the other of said valve seats when said fluid pressure forces are no greater than a preselected magnitude reached during operation of said damper assembly, and that are insufficient to move said control valve from one to the other of said valve seats when said fluid pressure forces are greater than said preselected magnitude.

2. Semiactive damper means as in claim 1, and further including control means for actuating said actuator.

3. Semiactive damper means as in claim 2, wherein said valve drive means further includes a spring member.

4. Semiactive damper means as in claim 1, wherein said fluid circuit means includes a first fluid passageway and a second fluid passageway each having first and second opposite ends respectively communicating with said first and second chambers, said second passageway permitting only relatively restricted flow of said fluid passing therefrom to one said chambers, said control valve member when in engagement with said first of said valve seats permitting during extension of said assembly said relatively free flow of said fluid from said first of said chambers to said second of said chambers via said first passageway, and causing during contraction of said assembly flow of said fluid from said second of said chambers to said first of said chambers to be via said second passageway.

5. Semiactive damper means as in claim 4, wherein said control valve member when in seated engagement with said second of said seats permits during contraction of said assembly said relatively free flow of said fluid from said second of said chambers to said first of said chambers via said first passageway, and during extension of said assembly causes flow of said fluid from said first chamber to said second chamber via said second passageway.

6. Semiactive damper means as in claim 5 wherein said first and second valve seats are located in spaced confronting relationship to each other intermediate the length of said first passageway, said control valve member being movable between said valve seats and when in engagement with said first valve seat being spaced from said second valve seat and blocking fluid flow in one direction between said seats while permitting fluid flow in the opposite direction between said seats.

7. Semiactive damper means as in claim 6, and further including a valve support member connected to and movable by said valve drive means, said control valve member being connected to said support member for movement therewith and for limited movement relative to said support member.

8. Semiactive damper mean as in claim 7, wherein said support member includes a rod and said control valve member is mounted upon said rod for limited sliding movement longitudinally thereof.

9. Semiactive damper means as in claim 8, and further including spring means engaging said control valve member and biasing the same to a preselected position upon said rod.

10. Semiactive damper means as in claim 9, wherein said spring means includes first and second springs disposed upon and respectively engaging opposite surfaces of said control valve member.

11. Semiactive damper means as in claim 7, wherein said control valve member has a flexible outer peripheral portion, and said limited movement is of said peripheral portion of said control valve member.

* * * * *